(12) United States Patent
Weldon et al.

(10) Patent No.: US 8,616,522 B2
(45) Date of Patent: Dec. 31, 2013

(54) IDLE AIR CONTROL VALVE

(75) Inventors: Craig Weldon, Chatham (CA); Yvon Sterling, Pain Court (CA); Albin Lootvoet, Brussels (BE)

(73) Assignee: Continental Tire Canada, Inc., Mississauga, ON (CA)

( * ) Notice: Subject to any disclaimer, the term of this patent is extended or adjusted under 35 U.S.C. 154(b) by 960 days.

(21) Appl. No.: 12/170,844

(22) Filed: Jul. 10, 2008

(65) Prior Publication Data

US 2009/0014673 A1    Jan. 15, 2009

Related U.S. Application Data

(60) Provisional application No. 60/948,772, filed on Jul. 10, 2007.

(51) Int. Cl.
*F16K 31/02* (2006.01)
(52) U.S. Cl.
USPC ........................... 251/129.11; 251/367
(58) Field of Classification Search
USPC ................ 251/129.11, 129.01, 366, 367
See application file for complete search history.

(56) References Cited

U.S. PATENT DOCUMENTS

| | | | |
|---|---|---|---|
| 4,333,026 A * | 6/1982 | Bock et al. | 310/49.18 |
| 4,650,156 A * | 3/1987 | Kawahira | 251/129.11 |
| 4,723,754 A | 2/1988 | Torimoto et al. | |
| 5,137,255 A * | 8/1992 | Sumida et al. | 251/77 |
| 5,675,248 A * | 10/1997 | Kurita et al. | 324/174 |
| 6,155,875 A | 12/2000 | Ineson | |
| 6,254,058 B1 * | 7/2001 | Keller | 251/69 |
| 6,455,973 B1 * | 9/2002 | Ineson et al. | 310/190 |
| 6,492,751 B1 | 12/2002 | Ineson et al. | |
| 6,645,006 B1 | 11/2003 | Crisanti et al. | |
| 6,674,208 B2 | 1/2004 | Ineson et al. | |
| 7,690,898 B2 * | 4/2010 | Kume et al. | 417/222.2 |
| 7,816,819 B2 * | 10/2010 | Ohkawa et al. | 310/43 |
| 2008/0045065 A1 * | 2/2008 | O'Connor | 439/271 |

FOREIGN PATENT DOCUMENTS

| | | |
|---|---|---|
| EP | 1296049 A | 3/2003 |
| EP | 1734236 A | 12/2006 |
| KR | 20040089866 A | 10/2004 |
| WO | WO2007145311 A | 12/2007 |

OTHER PUBLICATIONS

International Preliminary Report on Patentability mailed on Jan. 21, 2010.
Search Report and Written Opinion mailed on Nov. 20, 2008 for PCT/US2008/069601.

* cited by examiner

*Primary Examiner* — John K Fristoe, Jr.
*Assistant Examiner* — Marina Tietjen

(57) ABSTRACT

An idle air control valve includes a sleeve that defines an internal space and an electrical connector including terminals attached to the sleeve. The connector is joined to the sleeve to enclose the actuator.

17 Claims, 3 Drawing Sheets

IDLE AIR CONTROL VALVE

CROSS REFERENCE TO RELATED APPLICATION

The application claims priority to U.S. Provisional Application No. 60/948,772 which was filed on Jul. 10, 2007.

BACKGROUND OF THE INVENTION

This disclosure generally relates to an electrical connector for a control valve. More particularly, this disclosure relates to an electrical connector including features for securing and mounting the control valve.

An electrical connection for a control valve typically includes either a cable with several wires terminated at one end by a connector or a connector to which a cable from power and control source is attached. The connector includes a housing within which a plurality of terminals is mounted. The housing will include features to provide a secure fit to the mating electrical connection. Electrical connections are susceptible to intrusion of moisture and other contaminants that can cause undesired electrical shorts.

Accordingly, it is desirable to design and develop an electrical connector for a control valve with features to prevent intrusion of moisture or other undesired contaminants.

SUMMARY OF THE INVENTION

An example disclosed idle air control valve includes a sleeve that defines an internal space and an electrical connector attached to the sleeve.

The connector includes a first set of terminals for connecting to a mating connector and a second set of terminals that extends into the sleeve and into electrical contact with an electrical actuator. The connector provides the top portion of the sleeve to enclose the actuator and provide a relatively compact valve package. The connector includes a mounting flange extending radially outward and includes a notch for receiving a portion of a fastening member. The position of the notch is located to radially orientate the control valve. Further, the example flange extends only partially about the connector to also aid in orientating the control valve.

These and other features of the present invention can be best understood from the following specification and drawings, the following of which is a brief description.

DETAILED DESCRIPTION OF THE PREFERRED EMBODIMENT

Figure 1:
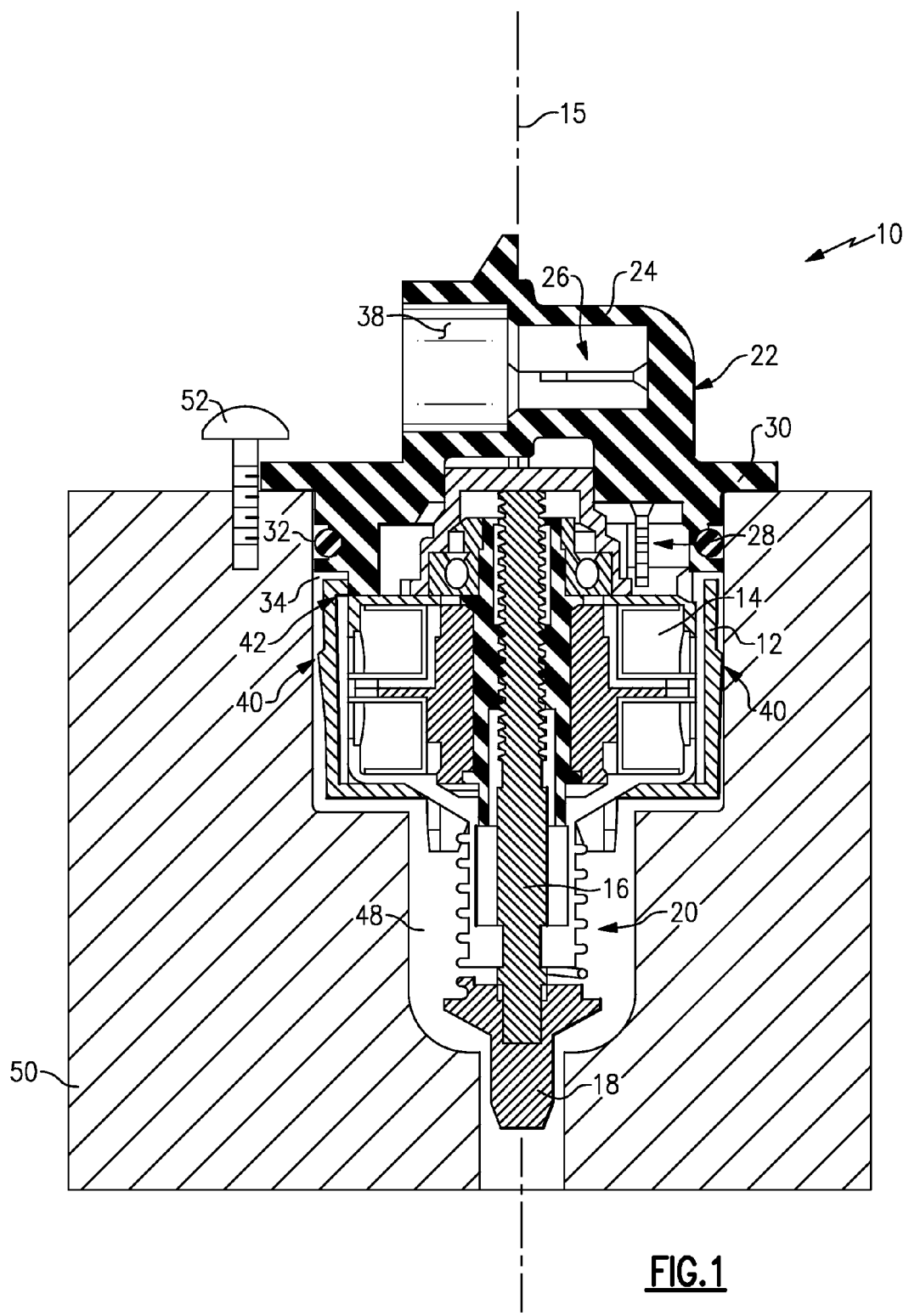
FIG. 1 is a cross-sectional view of an example idle air control valve.

Referring to FIG. 1, an example idle air control valve 10 includes a sleeve 12 that defines an internal space. A stepper motor 14 is disposed within the sleeve 12 and drives a pintle 16 along an axis 15. A cap 18 is attached to an end of the pintle 16 and a spring 20 is supported between the sleeve 12 and the cap 18 to bias the pintle 16 in a desired direction along the axis 15. The example idle air control valve 10 is assembled into a bore of a 48 of a manifold 50 or other engine component. A fastener 52 provides retention of the control valve 10 within the bore 48.

An electrical connector 22 is joined to the sleeve 12 and includes terminals 26 within a cavity 38 for mating to an external connector (not shown). The connector 22 also includes a second set of terminals 28 that extends into the space defined by the sleeve 12 into electrical contact with the stepper motor 14. The terminals 26 are in electrical communication with the terminals 28 to connect and drive the stepper motor 14 as desired.

The example connector 22 and sleeve 12 are fabricated from a plastic material and are secured to each other through an ultrasonic weld at a joint interface indicated at 34. The joint 34 between the sleeve 12 and the connector 22 provides a substantially air tight seal that prevents intrusion of moisture and other undesired contaminants. Although, the example sleeve 12 and connector are attached by way of ultrasonic welding other plastic joining processes are also within the contemplation of this invention. Because the connector 22 also provides the top portion of the sleeve 12 to enclose the stepper motor 14, the entire example control valve is provided in a relatively compact package.

The sleeve 12 includes a plurality of ribs 40 radially spaced apart and extending in a direction common to the axis 15. Each of the ribs 40 extend outward from the sleeve an equal amount for centering the control valve 10 within the bore 48 of an engine manifold or other structure within which the control valve 10 is mounted. The ribs 40 provide an interference fit to aid in retention of the control valve 10 within the mating bore.

A seal 32 provided on the connector 22 also provides a centering function. The example seal 32 is a 0-ring that seals against an inner surface of the bore 48. The seal 32 prevents blow by of air that is regulated by the control valve 10.

The example control valve 10 is mounted within the bore 48 of an intake manifold to control the flow of air through the manifold during idle conditions; however the example control valve 10 could also be mounted in other locations as may be desired.

Figure 2:
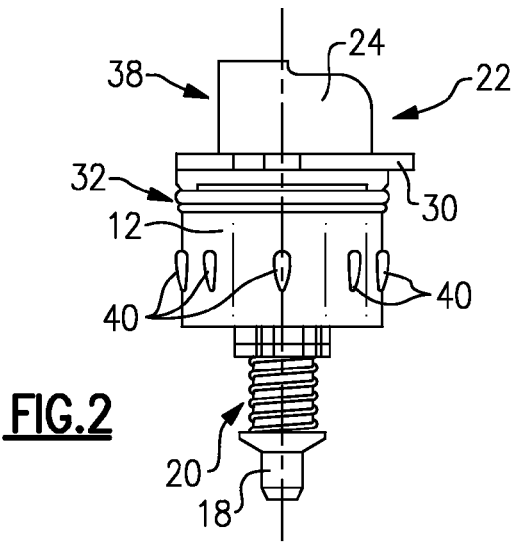
FIG. 2 is a side view of the example idle air control valve.
Figure 3:
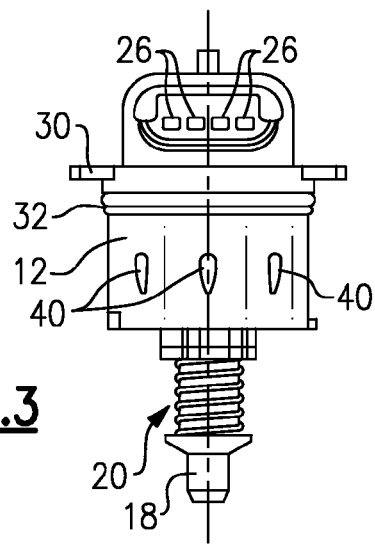
FIG. 3 is a front view of the example idle air control valve.
Figure 4:
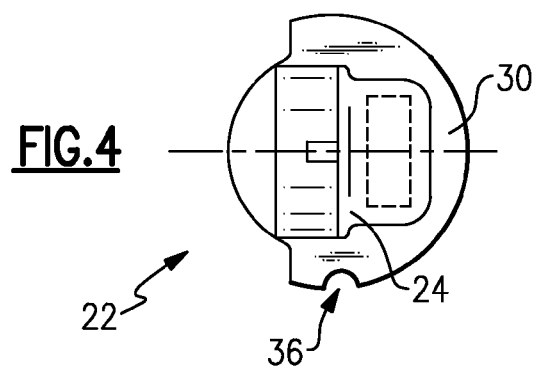
FIG. 4 is a top view of the example idle air control valve.

Referring to FIGS. 2-4, the example control valve 10 includes the integral connector 22 that is attached to the sleeve 12. The connector 12 includes a mounting flange 30 extending radially outward transverse to the axis 15. The mounting flange 30 includes a notch 36 for receiving a portion of the fastener 52 (FIG. 1). The position of the notch 36 is located to radially orientate the control valve 10. Further, the example flange 30 extends only partially about the connector 22 to provide another functioning means of radially orientating the control valve 10. The location of the example notch 36 can be modified to meet application specific requirements.

The example connector 22 includes a groove for supporting the seal 32. The example seal 32 is an o-ring that seals against the inner surface of a bore within which the control valve 10 is mounted. The same bore also engages the ribs 40 to center the control valve 10.

Figure 5:
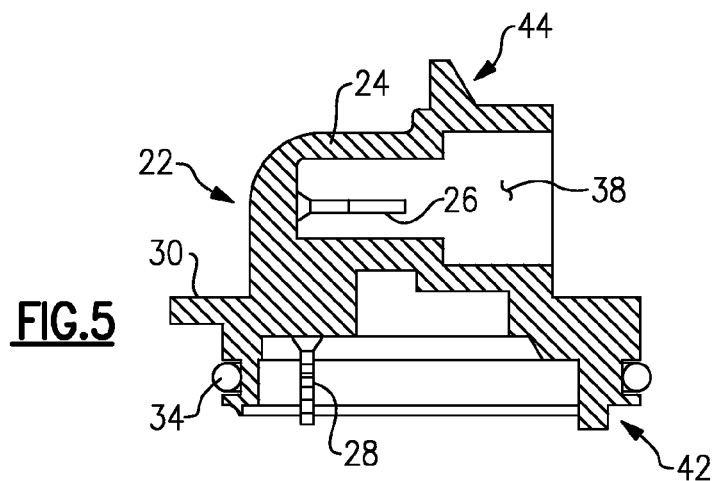
FIG. 5 is a cross-sectional view of an example electrical connector.
Figure 6:
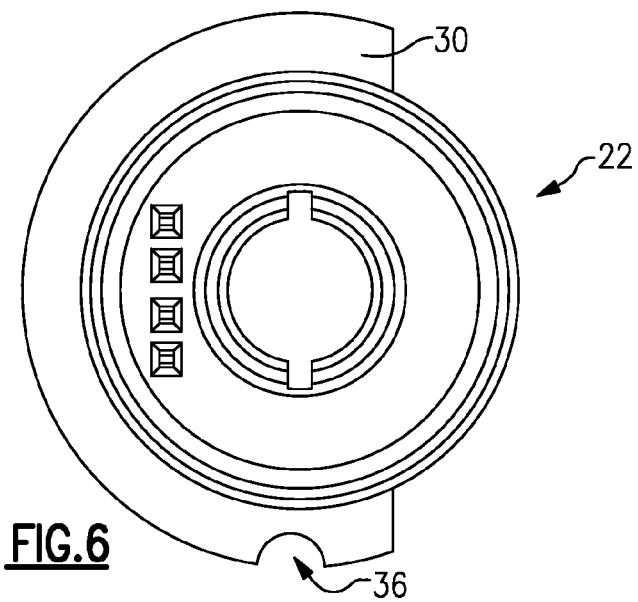
FIG. 6 is a bottom view of the example electrical connector.
Figure 7:
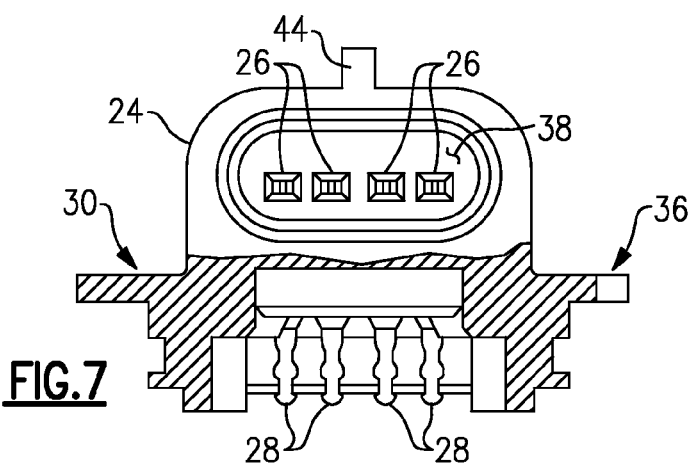
FIG. 7 is a front view of the example electrical connector.

Referring to FIGS. 5-7, the example connector 22 includes a hood 24 that defines the cavity within which the terminals 26 are mounted. The shape of the cavity 38 is matched to receive a desired mating connector in one orientation to assure proper electrical connections. The example hood 24 includes a tab 44 for engaging a securement feature on a mounting connector. Although the example hood 24 includes the tab 44, other securement configuration is also within the contemplation of this invention.

A circumferential lip 42 engages the sleeve 12 (FIG. 1) at the joint 34 to facilitate the ultrasonic joining process. As appreciated, other lip configurations as are known to facilitate joining of the sleeve 12 to the connector 22 are within the contemplation of this invention.

The mounting flange 30 provides an axial stop and radial orientation function. The mounting flange 30 prevents insertion of the control valve 10 to far into the bore. Further, the flat portion of the mounting flange 30 can be keyed to other features to prevent installation of the control valve 10 incorrectly. Further, the single notch 36 provides a further keyed feature to provide only a desired orientated installation.

The example sleeve 12 and connector 22 are fabricated from a plastic material, and therefore the outer shell enclosing the stepper motor 14 is not electrically conductive. Accordingly, electrical shorts through the mounting points of contact are substantially prevented. Further, the incorporation of the terminal connections into the connector remove the need for soldered electrical connections to provide more reliable electrical connections.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A control valve assembly comprising:
a plastic housing;
an electric actuator disposed within the housing; and
a plastic electrical connector joined to an axially facing surface of the housing to form a seal between an axially facing surface of the electrical connector and the axially facing surface of the housing, the electrical connector including a plurality of electrical contacts communicating with the electric actuator and a flange extending outward from the electric connector for securing the control valve assembly in place and a circumferential lip that engages a radially inner surface of the housing, wherein a joint is formed between the axially facing surface of the plastic housing and the axially facing surface of the electrical connector, the joint defining the seal between the axially facing surface of the electrical connector and the axially facing surface of the plastic housing that extends to a radially outermost surface of the housing.

2. The assembly as recited in claim 1, including a seal disposed on an outer surface of the connector for preventing blow by past the control valve.

3. The assembly as recited in claim 1, wherein the flange comprises a planar portion extending radially outward from the electrical connector.

4. The assembly as recited in claim 3, wherein the flange extends partially about an outer circumference of the electrical connector.

5. The assembly as recited in claim 1, wherein the flange includes a notch for partially receiving a fastening member.

6. The assembly as recited in claim 1, wherein the housing comprises a plurality of ribs extending from an outer surface for centering the valve assembly within a bore.

7. The assembly as recited in claim 6, wherein the ribs include a length in an axial direction and are spaced apart about an outer periphery of the housing.

8. The assembly as recited in claim 6, wherein the plurality of electrical contacts comprise a first plurality of electrical contacts disposed within a hood, and a second plurality of electrical contacts in electrical contact with the first plurality of electrical contacts and extending outwardly from the connector into electrical contact with the electric actuator.

9. The assembly as recited in claim 1, wherein the electrical connector comprises a plastic material and the plurality of electrical contacts are at least partially molded within the plastic material.

10. The assembly as recited in claim 9, including an ultrasonic weld joining the electrical connector to the housing at the joint.

11. An idle air control valve assembly comprising:
a plastic sleeve defining an inner space;
an electric actuator mounted within the sleeve; and
a plastic electrical connector welded to a radially inner surface of the sleeve to enclose the electric actuator within the inner space and form a seal between the radially inner surface of the sleeve and radially outer surface of the electrical connector, the electrical connector including a plurality of terminals in communication with the electric actuator and a mounting flange disposed at least partially about an outer surface of the electrical connector, wherein a joint is defined between the plastic electrical connector and the plastic sleeve, the joint comprising a welded interface between the radially inner surface of the plastic sleeve and the radially outer surface of the plastic electrical connector and axially facing surfaces of the sleeve and the connector to form a seal that extends to a radially outermost surface of the sleeve.

12. The assembly as recited in claim 11, including an actuating member movable along an axis by the electric actuator.

13. The assembly as recited in claim 12, wherein the mounting flange extends radially outward from the electrical connector transverse to the axis.

14. The assembly as recited in claim 13, wherein the flange includes a notch for partially receiving a fastening member and for defining a radial location of the control valve assembly.

15. The assembly as recited in claim 11, wherein the plastic sleeve includes a plurality of ribs having an axial length and extending radially outward form the plastic sleeve for centering the valve assembly within a bore.

16. The assembly as recited in claim 15, wherein the ribs are spaced apart from each other about the outer periphery of the plastic sleeve.

17. The assembly as recited in claim 11, wherein the sleeve and electrical connector are ultrasonically welded together at the joint.

* * * * *